Sept. 8, 1936.　　　J. J. SPRING　　　2,053,748
METALWORKING MACHINE
Filed July 20, 1934　　　5 Sheets-Sheet 1

Inventor
Joseph J. Spring
By W. Clay Lindsey
Attorney

Sept. 8, 1936.　　　J. J. SPRING　　　2,053,748
METALWORKING MACHINE
Filed July 20, 1934　　　5 Sheets-Sheet 2

Inventor
Joseph J. Spring
By H. Clay Lindsey
Attorney

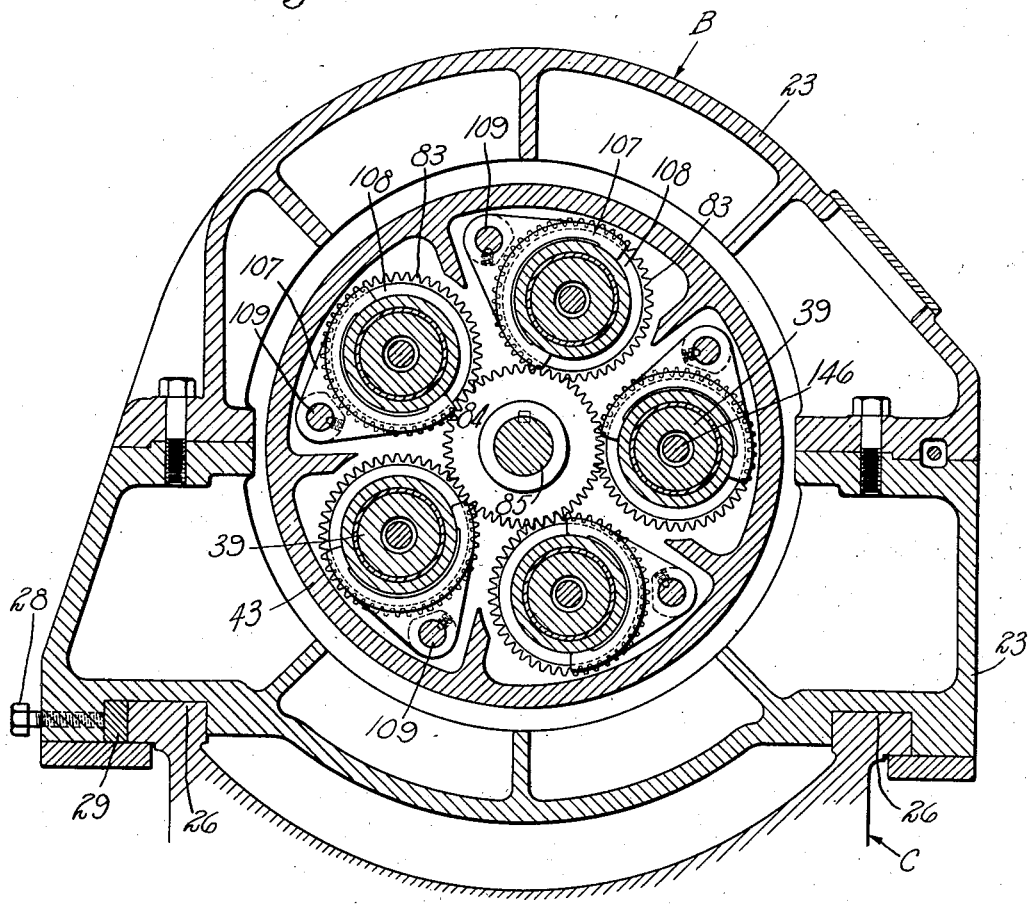

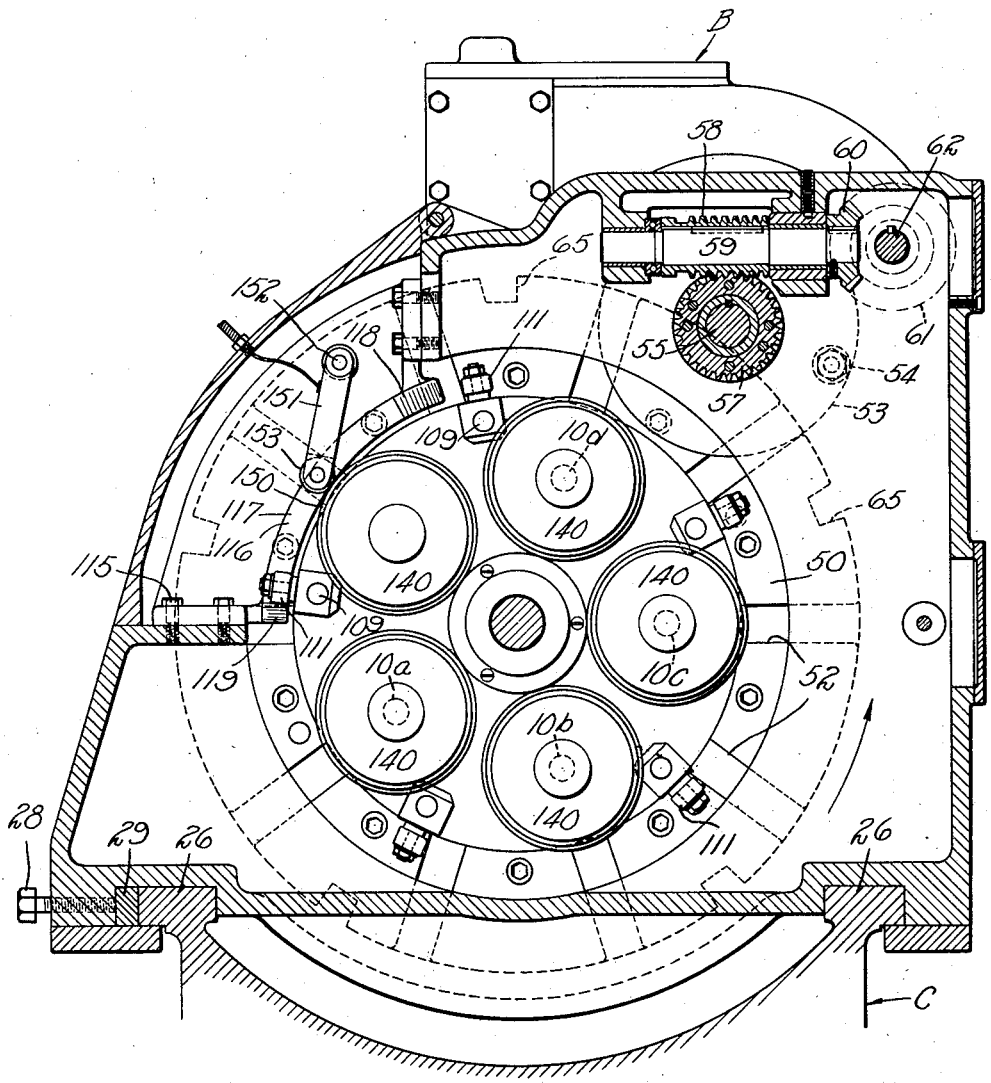

Sept. 8, 1936.  J. J. SPRING  2,053,748
METALWORKING MACHINE
Filed July 20, 1934   5 Sheets-Sheet 5
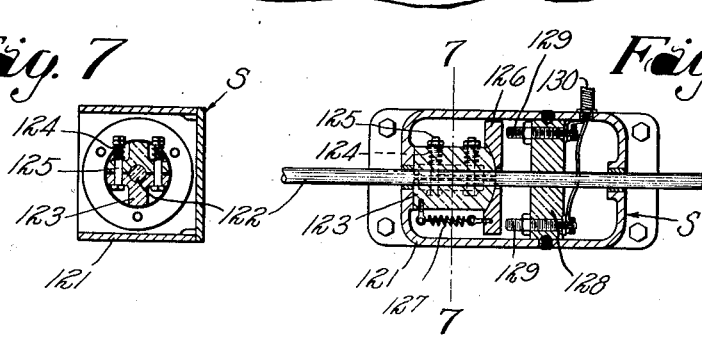

Patented Sept. 8, 1936

2,053,748

UNITED STATES PATENT OFFICE 2,053,748

METALWORKING MACHINE

Joseph J. Spring, Berlin, Conn., assignor to The Goss and De Leeuw Machine Company, New Britain, Conn., a corporation of Connecticut Application July 20, 1934, Serial No. 736,166

9 Claims. (Cl. 29—38)

This invention relates to improvements in metal working machines, and has particular reference to machines known as automatic chucking machines of the type having a plurality of tooling stations and a plurality of power driven work holding spindles, the spindles being successively indexible into operative relation to the several tooling stations in order that successive operations may be carried out on the pieces of work.

In automatic chucking machines of this type, it has heretofore been customary to provide the chuck spindles with friction clutches in order that the power may be thrown on and off the spindles at the loading position without affecting the operation of the remaining spindles. The use of friction clutches, however, in machines of this sort is open to many objections and disadvantages, among which may be mentioned that the clutches burn and wear out quickly, they require constant attention and adjustment, and they are impositive in their operation; that is, there is objectionable slippage between the clutch members which results in improper distribution of the power to the several spindles and faults in the machining operations. It has been proposed to use positive acting clutches, such as dog or tooth clutches, so as to avoid the objections incident to the use of friction clutches, but in prior arrangements where dog clutches are used the efficiency of the machine has been relatively low because of the necessity of running the machine at a relatively low speed in order to permit proper meshing of the clutch members.

The aim of the present invention is to provide an improved chucking machine of the character described wherein the above and other objections and disadvantages of machines heretofore constructed are eliminated and, more particularly, to provide an improved machine the work spindles of which may be driven at a relatively high speed in order that the full capacity and efficiency of the machine may be employed, the spindles being positively driven through dog or tooth clutches which may be disengaged and engaged to render the spindle at loading position non-rotative without introducing any objectionable shocks or racking strains in the several parts of the machine. With my improved arrangement, the machine will operate very smoothly and quietly at greater speeds and, therefore, it will have a relatively long life and a high rate of production.

A further aim of the invention is to provide in an automatic chucking machine an improved, simplified, and effective arrangement by means of which the chucks may be automatically opened and closed at the loading position.

Other objects will be in part obvious, and in part pointed out more in detail hereinafter.

The accompanying drawings illustrate a suitable mechanical embodiment of the idea of the invention. The drawings, however, are for the purpose of illustration only and are not to be taken as limiting the invention the scope of which is to be measured entirely by the scope of the appended claims.

In the drawings,—

Fig. 3 is a transverse sectional view through the work head, the same being taken on the line 3—3 of Fig. 2 and looking in the direction of the arrows;

Fig. 4 is also a transverse sectional view through the work head, the same being taken on the line 4—4 of Fig. 2 and looking in the direction of the arrows;

Fig. 5 is an elevational view of a portion of one of the chuck spindles, a fragmentary portion of the supporting structure of the work head also being shown;

Fig. 6 is a longitudinal sectional view of the tool head operated switch mechanism;

Fig. 7 is a transverse sectional view thereof, the same being taken on the line 7—7 of Fig. 6; and Fig. 8 is a developed view of the drive for the chucks.

Figure 1:
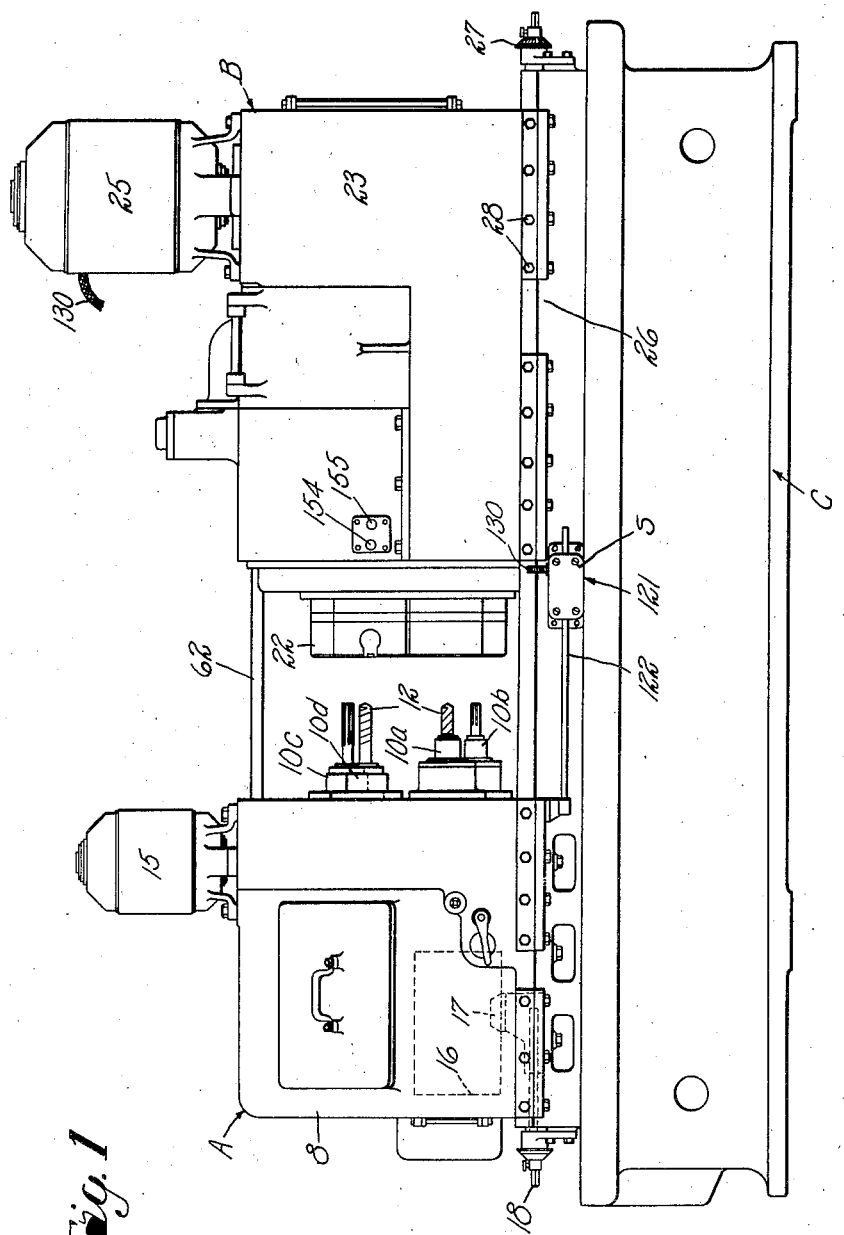
Fig. 1 is an elevational view of an automatic metal working machine constructed according to the idea of this invention.

Referring to the drawings in detail, A indicates a tool head and B indicates a work head, the tool head and work head being mounted in opposed relation to each other upon a bed C. The tool head has a slide 8 which carries a plurality of tool holders (in the present illustrative disclosure, spindles) which may be fitted with tools 12 of various sorts, such as tools for performing boring, facing, turning, and reaming operations. In the present illustrative disclosure where the machine has five work chucks 22, four tool stations are provided, these stations being respectively designated by the characters 10a, 10b, 10c, and 10d, in the order of the several working or tooling stations. In Fig. 4, the tool spindles are diagrammatically shown by broken line circles in order to illustrate their relation to the work chucks. It will be observed from this figure that there is no tool spindle opposed to the upper left-hand chuck; that is, the chuck which is in the loading position.

The tool spindles may be continuously driven by a motor 15 through any suitable connections, the same not being shown as they form no part of the present invention. In the present illustrative disclosure, the tool head is adapted to be reciprocated on the bed C towards and away from the work head B so as to bring the tools into operative association with the work pieces carried by the chucks and to move the tools clear of the work pieces when the instant operations have been completed. The tool head may be reciprocated in any suitable manner but, by way of example, there is shown, more or less diagrammatically in Fig. 1, a cam 16 for this purpose. This cam may be similar in construction and operation to the cam designated b53 in the patent to De Leeuw No. 1,626,187 granted April 26, 1927. It may be continuously driven by the motor 15 through a driving arrangement similar to that shown in said De Leeuw patent. The cam 16 has a cam groove into which extends a roller 17 the position of which may be adjusted by a screw 18 in the manner disclosed in said De Leeuw patent in order to determine the limits of sliding movement of the tool head.

The work head B carries a plurality of work holding chucks 22 which are power driven to rotate about their respective axes by any suitable means, such as the motor 25, which may be carried by the slide or casing 23 of the work head, it being understood that a stationary source of power may be employed or a shiftable drive belt or a suitable clutch may be interposed between such source of power and the chuck drive. The work head may be adjusted along ways 26 on the bed C by suitable means, such as a micrometer screw 27, and it may be rigidly secured in its adjusted position by suitable means, such as bolts 28, which bear against a bar 29 engaging the side of one of the ways 26.

The chucks are supported for indexing movement in the work head B by a suitable turret. This turret is a hollow drum-shaped casting having a front wall 37 provided with spaced apertures for the reception of bearings 38 for the chuck spindles 39, the bearings being concentrically arranged about the axis of rotation of the turret and being spaced at equal distances apart. The distance between two adjacent bearings will depend upon the number of chucks carried by the turret. In the present instance, the turret carries five chucks and, therefore, the centers of adjoining bearings will be 72 degrees apart. The turret is also provided with a rear wall 40 having apertures for the spindle supporting bearings 38' which are coaxial with the respective bearings 38. The front wall 37 and the rear wall 40 are connected by a circumferential wall 43 provided adjacent its opposite ends with bearing surfaces rotatably received in the front and rear bearings 46 and 47 in the forward portion of the work head slide. The turret, at its forward end, has a circumferential flange 48 the rear face of which bears against a bearing provided on the forward end of the work head slide.

For the purpose of indexing the turret, a Geneva motion device is provided which includes an annular ring 50 secured to the rear portion of the turret and provided with spaced radial grooves 52. The driving member of the Geneva motion device comprises a disk 53 provided with a roller 54 adapted to engage in the grooves 52. The disk is carried by a shaft 55 supported by bearings 56. The disk 53 and the shaft 55 may be driven in any suitable manner in timed relation to the reciprocating movements of the tool head. By way of example, I have shown in the present instance the shaft as being provided with a worm wheel 57 meshing with a worm 58 on a shaft 59 having a bevel gear 60. Meshing with this gear is a bevel gear 61 fixed to a shaft 62 which extends over to the tool head (see Fig. 1) and is driven by the motor 15. The driving connection between the motor and the shaft may be similar to that disclosed in said De Leeuw Patent No. 1,626,187, it being sufficient to here state that the arrangement is such that during each time the tool head is withdrawn from the work head and while the tools are disengaged from the pieces of work, the Geneva motion device operates to index the turret one step (that is, 72 degrees in the present instance), thereby bringing the chuck which was at the last tooling station to loading position, bringing the chuck which was at loading position to the first tooling position, and advancing each of the other three chucks one tooling station.

For the purpose of accurately and securely holding the turret in each of its indexed positions, the ring 50 is provided in its periphery with a plurality of notches 65, and a locking bolt 66 is provided for engagement in these notches. The locking bolt is mounted for vertical movement in the top of the work head slide, and is normally urged to operative position by springs 67. The locking bolt is disengaged from the ring 50 just prior to the indexing motion of the turret through any suitable arrangement, the same not being shown in the present instance as it forms no part of the present invention, it being sufficient to state that an arrangement similar to that disclosed in said De Leeuw patent may be employed. The numeral 68 designates the usual clamping ring for holding the turret steady during the tooling operations.

As previously pointed out, the chuck spindles 39 and angularly spaced apart at like distances and they are concentrically arranged about the axis of rotation of the turret. The spindles are supported by the bearings 38 and 38'. The chucks are secured to the forward enlarged ends of the spindles by screws 70 or the like. The chucks may be of any suitable type, each here being shown as having a head or body 80, radially movable jaws 81, and an axially movable wedge 82 adapted, when advanced, to force the jaws apart and, when withdrawn, to move the jaws towards each other and into gripping relation with the work. These chucks are disclosed for illustrative purposes as being of a type similar to that disclosed in the patent to Garvin, et al., No. 976,452.

Figure 2:
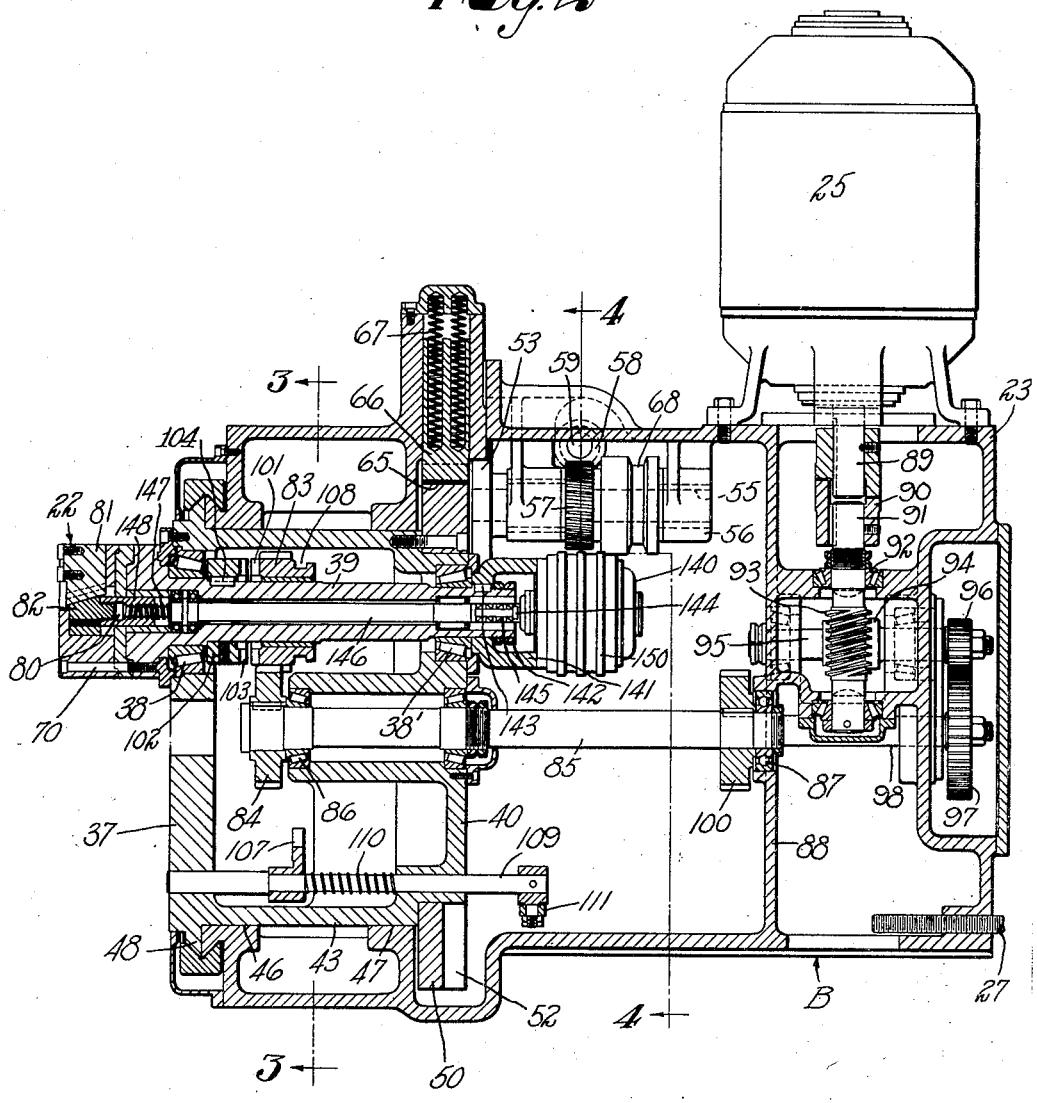
Fig. 2 is a vertical sectional view taken longitudinally and centrally through the work head.

In accordance with the present invention, the chuck spindles are positively driven during the machining operations and, to that end, as shown in Fig. 2, each of the spindles is provided with a gear 83, and all of these gears are in constant mesh with a centrally located gear 84 fixed to the forward end of a common drive shaft 85. The forward end of this shaft 85 is journaled in bearings 86 axially located within the turret, and the rear end of the shaft is journaled in a bearing 87 carried by a web 88 of the work head slide 23. The shaft 85 is driven by the motor 25 vertically mounted upon the top of the work head slide. The driving connections between the motor and shaft 85 are shown in detail in Fig. 2 and more or less diagrammatically in Fig. 8. Referring to these figures, it will be noted that the motor shaft 89 is connected, through a coupling 90, to the upper end of a shaft 91 suitably journaled in bearings 92 carried by webs or partitions in the work head slide. This shaft 91 has a worm 93 meshing with a worm wheel 94 fixed to a shaft 95 which carries, at its rear end, a spur gear 96. The gear 96 meshes with a gear 97 carried by a shaft 98 which has, on its forward end, a gear 99 meshing with a gear 100 on the rear end of the shaft 85. The gears 96 and 97 are readily accessible and detachable so that other sets of gears of different ratios may be substituted therefor to alter the rate of speed at which the chucks are driven by the motor 25.

In order that the chuck at loading position may be rendered non-rotative in order to facilitate the unloading and loading of the chuck at that position while the remaining chucks are being positively driven during the several tooling operations, each spindle is provided with a positive clutch, and means are provided for disengaging the clutch of each spindle as the latter is brought into loading position on one indexing movement of the turret and again engaging it on the next indexing movement. In the present illustrative disclosure, each gear 83 also constitutes the slidable member of a positive acting clutch. To this end, each gear 83 is slidably mounted on its respective spindle and is provided at one end with teeth 101. The fixed member of each clutch constitutes a collar 102 having clutch teeth 103 adapted to engage with the teeth 101 when the gear 83 is moved to its foremost position. Each clutch member 102 is fixedly secured to its respective spindle by a key 104. The gear 83 is loose on the spindle except when the clutch is engaged. Each of the movable clutch members 83 has associated therewith a connection through which it may be shifted into and out of engagement by suitable cams. Each of these connections includes a fork 107 the arms of which engage in a groove 108 of the associated clutch member 83; a rod 109 carrying the fork and slidably mounted in the turret in parallelism with the spindle; a spring 110 about the rod and between the fork and a fixed abutment on the turret for the purpose of normally urging the clutch into engagement; and a roller 111 secured to the rear end of the rod 109 and having its axis disposed at right angles to the length of the rod. Suitably secured to the work head slide, as by means of screws 115, is a cam member 116 having a dwell portion 117 disposed in a vertical plane to which the axis of the turret is perpendicular, a rise or disengaging portion 118 at the upper end of the dwell portion, and a fall or engaging portion 119 at the lower end of the dwell portion. The cam member 116 is so constructed and arranged that on each indexing movement of the turret, that roller 111 associated with the chuck spindle being brought to loading position, will engage the cam surface 118 resulting in disengagement of the clutch of that spindle, and the roller 111 associated with the chuck spindle which is being indexed from loading position to the first tooling station will ride down the cam surface 119, thus permitting engagement of the clutch of the latter spindle. Between successive indexing movements of the turret, the machining operations are performed, and the dwell portion 117 of the cam holds the clutch associated with that spindle located at loading position out of engagement, so that the chuck of that spindle may be unloaded and loaded without losing any time.

It will be observed that the clutches associated with the spindles are very strong and rugged and they are positive in operation. They are, therefore, capable of transmitting a large amount of power, and slippage, together with its objections, is entirely avoided. However, clutches of this type cannot be easily engaged under load and they cannot be engaged at high speeds and, therefore, in accordance with the present invention, means are provided whereby the clutches may be engaged during a time little or no driving action is being transmitted from the common drive shaft 85 to the spindles. To this end, means, controlled by the movement of the tool head, is provided for automatically deenergizing the motor 25 immediately before the turret is indexed, and then again energizing it after the indexing movement has been completed. The means for rendering the common drive inoperative during the indexing movement may take any suitable form, depending upon the particular driving mechanism employed, and other factors, but in the present instance there is shown, by way of illustration, a switch S for this purpose.

Referring to Figs. 1, 6, and 7, it will be seen that the switch S has a casing 121 secured to the bed C. Connected to and movable with the tool head is a rod 122 which slidably extends through the casing. Within the casing and surrounding the rod is a friction block 123 comprising two halves pressed into frictional engagement with the rod by springs 124 carried by bolts 125. The parts of this block are of insulating material. On the end of the block is a contact member 126 held against the block by springs 127. Fixed within the casing is a piece of insulation 128 carrying a pair of contact terminals 129 adapted to be engaged by the contact member 126. The terminals 129 are interposed in a line 130 leading to the motor 25. With this arrangement of switch, it will be seen that, when the tool head is in full withdrawn position, the switch is open, as shown in Fig. 6. When the tool head starts to slide, the block 123 moves with the rod 122 until the contact member engages the terminals 129 resulting in energization of the motor 25. The tool head and rod may continue to advance as the block 123 is only frictionally engaged with the rod. After the machining operations have been completed, the tool head starts to withdraw and, thereupon, the switch is immediately opened, the block 123 moving back with the rod until the block comes into engagement with the end of the casing.

The operation of the construction so far described is briefly as follows: During the tooling operations, the tool head, of course, is in advanced position so the switch S is closed and the work spindles, with the exception of the one at loading station, are being driven by the motor 25. As soon as the instant tooling operations are completed, the cam 16 starts to withdraw the tool head from the work head, and thereupon the switch S is broken, with the result that the motor 25 is deenergized so that the power on the tool spindles is discontinued. As soon as the tools have cleared the pieces of work, the turret is indexed, and during the indexing movement the clutch of that spindle which is being moved into the loading station is disconnected by the cam 118, while the clutch of that spindle which is moving from loading position to the first tooling station is permitted to become engaged (under the influence of the spring 110) by the cam 119. Since these spindles are not being driven during the indexing movement, they may be readily engaged and disengaged. When the tool head starts to again advance, the switch S is closed so as to energize the motor and thereby drive all of the tool spindles except that tool spindle which is now at loading position. The clutch of the latter spindle is now being held disengaged by the dwell portion 117 of the cam member 116, so that the now stationary chuck at loading position may be easily and conveniently unloaded and loaded.

It is observed that, during the indexing movement of the turret, the common drive gear 84 does not rotate and, as the gears 83 carried by the spindles move with the turret, these gears are caused to walk, so to speak, about the now stationary gear 84. Further, during the indexing movement, the combined gear and clutch member 83 of that spindle which is moving from loading position to the first tooling position is urged towards the clutch member 102 by the respective spring 110, the cam 119 permitting of sliding engaging movement of the member 83. The result is that, should the ends of the teeth of the two clutch members be brought into engagement, the clutch member 83 is rotated about its spindle, due to the walking movement referred to, until the teeth of that member come opposite the notches in the clutch member 102, whereupon the engagement of the two clutch members is completed, such engagement being effected while the spindles are not being positively rotated so that injury to the parts, clashing of the clutch members, and undue strains are avoided. It is further observed that the motor 25 is deenergized as soon as the tooling operations are completed so that the work pieces are stationary while the tools are being withdrawn and, therefore, those tools which are engaging the work during the withdrawal operation will have only a straight score mark on the work instead of a spiral score mark as heretofore.

In order to facilitate the loading and unloading of work pieces from the chucks at the loading position, suitable means are provided, including a motor permanently and individually associated with each chuck spindle for automatically operating the chuck jaws to release the finished work from the chucks and clamp the new pieces of work therein. As particularly illustrated in Fig. 2, a motor, as indicated at 140, is mounted upon the rear end of each of the spindles 39 by means of a bracket 141 secured upon the spindle by suitable means, such as a nut 142 and key 143. The motor shaft 144 is connected, through a suitable lost motion connection 145, with the rear end of a shaft 146 which extends through the hollow spindle 39 to the forward end thereof and is there provided with a screw threaded extension 147 which takes in an internally threaded bushing 148 operatively connected at its forward end to the wedge 82. Upon rotation of the motor shaft in one direction, the wedge is caused to separate the jaws. Upon rotation of the motor shaft in the opposite direction, the wedge is caused to close the jaws. The motor 140 carries a plurality of contact rings 150 to which current is supplied by a plurality of contact elements 151, particularly illustrated in Figs. 4 and 5. These contact elements may each consist of an arm pivoted at one end to a shaft 152 secured to a fixed portion of the work head slide and, preferably, to the cam 116. At their free ends, these lever members carry contact rollers 153 which respectively engage the rings 150. The contact elements, which, of course, are located only at the loading position, are connected up to manually operable switches such, for example, as are exemplified by the push buttons 154 and 155 shown in Fig. 1. With the arrangement described, as a work spindle is brought to loading position, the rings on the motor carried by that spindle will be brought into engagement with the respective contact rollers 153. The operator may push the push button 154 so as to cause the motor to rotate in that direction which will result in the chuck jaws being moved apart. After the chuck is loaded with a new piece of work, the operator may push the other push button 155 resulting in the motor rotating in the opposite direction and closing the chucks upon the piece of work. The lost motion connection between the motor shaft and the shaft 146 provides means for allowing the motor to come up to speed without load so that the jaws may be very firmly wedged upon the work without the necessity of providing a heavy and powerful motor, as particularly set forth in the allowed application of Harry J. Hauck and Stanley T. Goss, Serial Number 625,146 filed July 18, 1932. The chucking motors are, of course, so constructed that they do not burn out upon being stalled.

While I have described and illustrated a particular mechanical embodiment of the idea of my invention, it is to be understood that the invention is not specifically limited to the construction so illustrated and described but that such changes in the size, shape, and arrangement of parts may be resorted to as come within the scope of the appended claims.

Having now described my invention so that others skilled in the art may clearly understand the same, what I desire to secure by Letters Patent is as follows:

I claim as my invention:

1. In an automatic chucking machine, a turret mounted for indexing movement about its own axis, means causing said indexing movement, a plurality of rotatable chuck spindles supported by said turret and adapted to be successively brought to a plurality of stations, one of said stations being a loading station, a work holding chuck carried by each of said spindles, means common to all of said spindles for driving the same, a positively acting clutch associated with each spindle and through which said spindles are driven, means for disengaging the clutch of a spindle as the latter is brought to loading position and engaging said clutch as it is moved out of loading position, and means automatically controlled in timed relation to said clutch engaging and disengaging means for discontinuing the power on said driving means from all spindles during the indexing movements of the turret.

2. In an automatic chucking machine, a turret mounted for indexing movement about its own axis, means to cause said indexing movement, a plurality of rotatable chuck spindles supported in said turret and adapted to be successively brought to a plurality of stations by said indexing movement, one of said stations being a loading station, a work holding chuck carried by each of the spindles, means common to all of said spindles for driving the same, a dog clutch associated with each spindle and through which said spindles are driven, automatic means arranged upon indexing movement of the turret to disengage the clutch of a spindle as the latter is brought to loading position and engage said clutch as the spindle is moved out of loading position, and automatic means for discontinuing the power on said spindle driving means during the indexing movements of said turret.

3. In an automatic chucking machine, a rotatable turret mounted for indexing movement about its own axis, means to rotate said turret to various indexing position, a plurality of rotatable chuck spindles rotatably supported upon said turret and adapted to be successively indexed to a plurality of stations, one of said stations being a loading station, a work holding chuck carried by each spindle, a positively acting clutch associated with each spindle and comprising a toothed clutch member fixed to the spindle and a slidable toothed clutch member loose on the spindle and movable into and out of engagement with said fixed clutch member, both of said clutch members of each clutch being indexable with the spindle on which it is located, means common to all of said slidable clutch members for driving the same, means controlled by the indexing movement of said turret for disengaging the clutch of a spindle as the latter is brought to loading position and engaging said clutch as it is moved out of loading position and for holding said clutch disengaged while the spindle is stationary at loading position, and automatic means for discontinuing the power on said spindle driving means during the indexing movements of the turret.

4. In an automatic chucking machine, a rotatable turret mounted for indexing movement about its own axis, driving means engageable with said turret to cause said indexing movement, a plurality of rotatable parallel spaced apart chuck spindles rotatably supported in said turret and concentrically arranged about the axis of rotation thereof, said chuck spindles being adapted to be successively brought to a plurality of stations by said indexing movement, one of said stations being a loading station, a work holding chuck carried by each spindle, a dog clutch associated with each spindle and comprising a toothed clutch member fixed to the spindle and a slidable toothed clutch member loose on the spindle and movable into and out of engagement with said fixed clutch member, both of the clutch members of each clutch being indexable with the spindle on which they are carried, means associated with each of said slidable clutch members for normally urging the same into engagement with their respective fixed clutch members, means common to all of said slidable clutch members for driving the same, a cam arranged upon indexing movement of the turret to control the disengagement and engagement of the clutch of a spindle as it is indexed into and out of loading position, and means for discontinuing the power on said clutch driving means during the indexing movements of the turret.

5. In an automatic chucking machine, a rotatable turret mounted for indexing movement about its own axis, means to rotate said turret through predetermined extents to cause said indexing movement, a plurality of rotatable, parallel spaced apart chuck spindles rotatably supported in said turret and concentrically arranged about the axis of rotation thereof, said chuck spindles being adapted to be successively brought to a plurality of stations, one of said stations being a loading station, a work holding chuck carried by each spindle, a clutch carried by each spindle and comprising a toothed clutch member fixed to the spindle and a slidable toothed clutch member loose on the spindle and movable into and out of engagement with said fixed clutch member, said slidable clutch members also comprising gears indexable with said spindles, a drive gear axially mounted in said turret and common to and in constant mesh with each of said slidable gears, means controlled by the indexing movement of the turret for disengaging the clutch of a spindle as the latter is indexed to loading position and engaging the clutch as it is indexed out of loading position, and means for discontinuing the power on said common drive gear during the indexing movements of the turret.

6. In an automatic chucking machine, a tool head, a plurality of tool holders in said head, a work head having a turret indexable about its own axis, a plurality of angularly spaced apart work spindles rotatably supported by said turret and having work holding chucks in opposed relation to said tool holders, means for indexing said turret for bringing each chuck successively into alignment with said holders and to a loading position, means common to all of said work spindles for driving the same, a positively acting clutch associated with each work spindle and through which the spindles are driven, means for disengaging the clutch of a work spindle as the latter is brought to loading position and engaging said clutch as it is moved out of loading position, means for moving one of said heads relative to the other, and means controlled by the movements of said movable head for discontinuing the power on said driving means during the indexing movements of the turret.

7. In an automatic chucking machine, a tool head, a plurality of parallel spaced apart tool spindles in said head, a work head having a turret indexable about an axis parallel to said tool spindles, a plurality of angularly spaced apart chuck spindles rotatably supported by said turret and having work holding chucks in opposed relation to said tool spindles, means for indexing said turret for bringing each chuck successively into alignment with said tool spindles and to a loading position, a clutch associated with each chuck spindle and comprising a toothed clutch member fixed to the spindle and a slidable toothed clutch member loose on the spindle and movable into and out of engagement with said fixed clutch member, said slidable clutch members also comprising gears, a drive gear axially mounted in said turret and common to and in constant mesh with each of said slidable gears, means controlled by the indexing movement of the turret for disengaging the clutch of a spindle as the latter is indexed to loading position and engaging the clutch as it is indexed out of loading position, a motor for driving said common drive gear, means for moving one of said heads relative to the other, and a switch for deenergizing said motor as the movable head starts to move away from the other head and for energizing the motor as the movable head starts to move towards the other head.

8. In an automatic chucking machine, a turret mounted for indexing movement about its own axis, a plurality of parallel spaced apart spindles journaled in said turret and concentrically arranged to the axis thereto, a chuck carried by the forward end of each spindle and having chuck operating means, a reversible electric motor secured to and rotatable with the rear end of each spindle, a driving connection between each motor and its respective chuck operating means, means for indexing said turret to move each chuck to successive stations including a loading station, each of said motors having contact rings, contact members positioned at the loading station and adapted to engage said rings when a motor is brought to that station, and means for controlling the direction of rotation of the motor at loading station.

9. In an automatic chucking machine, a tool head, a plurality of parallel spaced apart tool spindles in said head, a work head having a turret indexable about an axis parallel to said spindles, a plurality of angularly spaced apart chuck spindles rotatably supported by said turret and having work holding chucks in opposed relation to said tool spindles, means for indexing said turret for bringing each chuck successively into alignment with the tool spindles and to a loading position, a clutch carried by each spindle and comprising a toothed clutch member fixed to the spindle and a slidable toothed clutch member loose on the spindle and movable into and out of engagement with said fixed clutch member, said slidable clutch members also comprising gears, a drive gear axially mounted in said turret and common to and in constant mesh with each of said slidable gears, means controlled by the indexing movement of the turret for disengaging the clutch of a spindle as the latter is indexed to loading position and engaging the clutch as it is indexed out of loading position, a motor for driving said common drive gear, and means automatically controlled by said mechanism for controlling said driving means.

JOSEPH J. SPRING.